(12) United States Patent
Haugen et al.

(10) Patent No.: US 7,100,697 B2
(45) Date of Patent: Sep. 5, 2006

(54) METHOD AND APPARATUS FOR REFORMING TUBULAR CONNECTIONS

(75) Inventors: David M. Haugen, League City, TX (US); Doyle F. Boutwell, Jr., Houston, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 362 days.

(21) Appl. No.: 10/236,026

(22) Filed: Sep. 5, 2002

(65) Prior Publication Data

US 2004/0045717 A1 Mar. 11, 2004

(51) Int. Cl.
*E21B 19/00* (2006.01)

(52) U.S. Cl. .............. 166/380; 166/85.5; 166/77.51

(58) Field of Classification Search .......... 166/380, 166/77.51, 85.1, 85.5, 242.1, 242.6, 55.6, 166/55.7, 170, 173, 174, 77.52, 217, 207, 166/177.4; 407/9, 12, 13; 285/286.2; 405/184.4; 228/135; 294/86.12
See application file for complete search history.

(56) References Cited

U.S. PATENT DOCUMENTS

| | | | |
|---|---|---|---|
| 1,386,908 A | 8/1921 | Taylor | |
| 1,842,638 A | 1/1932 | Wigle | |
| 2,167,338 A * | 7/1939 | Murcell | 166/380 |
| 2,214,194 A | 9/1940 | Frankley | 251/84 |
| 2,214,429 A | 9/1940 | Miller | 166/16 |
| 2,522,444 A | 9/1950 | Grable | 166/16 |
| 2,610,690 A | 9/1952 | Beatty | 166/16 |
| 2,633,333 A | 3/1953 | Storm | 255/19 |
| 2,950,639 A | 8/1960 | Mason | 81/53 |
| 3,005,655 A * | 10/1961 | Jeffrey | 294/86.12 |
| 3,021,739 A | 2/1962 | Grundmann | 81/53 |
| 3,041,901 A | 7/1962 | Knights | 81/53 |
| 3,086,413 A | 4/1963 | Mason | 81/53 |
| 3,122,811 A | 3/1964 | Gilreath | 24/263 |
| 3,131,586 A | 5/1964 | Wilson | 81/52.4 |
| 3,180,186 A | 4/1965 | Catland | 81/57 |
| 3,193,116 A | 7/1965 | Kenneday et al. | 214/2.5 |
| 3,220,245 A | 11/1965 | Van Winkle | 73/46 |
| 3,233,315 A * | 2/1966 | Levake | 405/184.4 |
| 3,302,496 A | 2/1967 | Mitchell et al. | 81/53 |
| 3,349,455 A | 10/1967 | Doherty | 24/263 |
| 3,443,291 A | 5/1969 | Doherty | 24/263 |
| 3,475,038 A | 10/1969 | Matherne | 285/27 |
| 3,518,903 A | 7/1970 | Ham et al. | 81/57.16 |
| 3,559,739 A | 2/1971 | Hutchison | 166/311 |
| 3,621,548 A * | 11/1971 | Kinley et al. | 407/13 |
| 3,635,105 A | 1/1972 | Dickmann et al. | 81/57.18 |

(Continued)

FOREIGN PATENT DOCUMENTS

EP 0 285 386 10/1988

(Continued)

OTHER PUBLICATIONS 500 or 650 ECIS Top Drive, Tesco Drilling Technology, Apr. 1998.

(Continued)

*Primary Examiner*—David Bagnell
*Assistant Examiner*—Matthew J. Smith
(74) *Attorney, Agent, or Firm*—Patterson & Sheridan, LLP

(57) ABSTRACT

The present invention generally relates to methods and apparatus for connecting tubulars and reforming the connection between the tubulars. In one aspect of the invention, the tubulars are aligned, connected, and then reformed at the connection. In one embodiment, the reforming is accomplished by removing material from the tubular connection. Preferably, a broach is used to remove the material. In another embodiment, a reforming member operatively connected to a telescoping tubular is inserted into the tubulars.

46 Claims, 7 Drawing Sheets

U.S. PATENT DOCUMENTS

| | | | |
|---|---|---|---|
| 3,680,412 A | 8/1972 | Mayer et al. | 81/57.34 |
| 3,722,331 A | 3/1973 | Radulescu | 81/52.4 |
| 3,747,675 A | 7/1973 | Brown | 166/237 |
| 3,766,320 A | 10/1973 | Homme | 179/5 |
| 3,796,418 A | 3/1974 | Carlberg | 269/26 |
| 3,808,916 A | 5/1974 | Porter et al. | 81/57.19 |
| 3,838,613 A | 10/1974 | Wilms | 81/57.34 |
| 3,933,108 A | 1/1976 | Baugh | 114/0.5 |
| 3,941,348 A | 3/1976 | Mott | 251/58 |
| 3,952,936 A | 4/1976 | Dearman | |
| 3,986,564 A | 10/1976 | Bender | 173/4 |
| 4,005,621 A | 2/1977 | Turner, Jr. et al. | 81/57.2 |
| 4,142,739 A | 3/1979 | Billingsley | 285/18 |
| 4,159,637 A | 7/1979 | Lamb et al. | 73/46 |
| 4,170,908 A | 10/1979 | Peveto et al. | 81/57.11 |
| 4,221,269 A | 9/1980 | Hudson | 173/163 |
| 4,246,809 A | 1/1981 | Keast et al. | 81/57.16 |
| 4,257,442 A | 3/1981 | Claycomb | 137/238 |
| 4,262,693 A | 4/1981 | Giebeler | 137/494 |
| 4,291,762 A | 9/1981 | Gudgel | 166/85 |
| 4,295,527 A | 10/1981 | Russe | 166/315 |
| 4,315,553 A | 2/1982 | Stallings | 175/207 |
| 4,334,444 A | 6/1982 | Carstensen et al. | 81/57.18 |
| 4,346,629 A | 8/1982 | Kinzbach | 81/57.2 |
| 4,401,000 A | 8/1983 | Kinzbach | 81/57.2 |
| 4,402,239 A | 9/1983 | Mooney | 81/57.16 |
| 4,437,363 A | 3/1984 | Haynes | 81/57.18 |
| 4,442,892 A | 4/1984 | Delesandri | 166/85 |
| 4,445,265 A * | 5/1984 | Olson et al. | 285/286.2 |
| RE31,699 E | 10/1984 | Eckel | 73/862.25 |
| 4,492,134 A | 1/1985 | Reinholdt et al. | 81/57.34 |
| 4,494,424 A | 1/1985 | Bates | 81/57.18 |
| 4,499,919 A | 2/1985 | Forester | 137/613 |
| 4,565,003 A | 1/1986 | McLeod | 29/281.1 |
| 4,570,706 A | 2/1986 | Pugnet | 166/77.5 |
| 4,573,359 A | 3/1986 | Carstensen | 73/761 |
| 4,593,773 A | 6/1986 | Skeie | 175/85 |
| 4,625,796 A * | 12/1986 | Boyadjieff | 166/77.52 |
| 4,643,259 A | 2/1987 | Zeringue, Jr. | 166/77.5 |
| 4,709,599 A | 12/1987 | Buck | 81/57.18 |
| 4,709,766 A | 12/1987 | Boyadjieff | 175/52 |
| 4,712,284 A | 12/1987 | Coyle, Sr. et al. | 29/240 |
| 4,715,625 A | 12/1987 | Shows, Jr. et al. | 285/145 |
| 4,735,270 A | 4/1988 | Fenyvesi | 175/113 |
| 4,759,239 A | 7/1988 | Hamilton et al. | 81/57.34 |
| 4,773,218 A | 9/1988 | Wakita et al. | 60/476 |
| 4,800,968 A | 1/1989 | Shaw et al. | 175/85 |
| 4,811,635 A | 3/1989 | Falgout, Sr. | 81/57.33 |
| 4,813,493 A | 3/1989 | Shaw et al. | 173/164 |
| 4,836,064 A | 6/1989 | Slator | 81/57.18 |
| 4,867,236 A | 9/1989 | Haney et al. | 166/77.5 |
| 4,878,546 A | 11/1989 | Shaw et al. | 173/163 |
| 4,938,109 A | 7/1990 | Torres et al. | 81/467 |
| 4,979,356 A | 12/1990 | Vatne | 81/57.16 |
| 5,000,065 A | 3/1991 | Haynes | 81/57.2 |
| 5,022,472 A | 6/1991 | Bailey et al. | 175/195 |
| 5,044,232 A | 9/1991 | Schulze-Beckinghausen | 81/57.18 |
| 5,092,399 A | 3/1992 | Lang | 166/77.5 |
| 5,150,642 A | 9/1992 | Moody et al. | 81/57.2 |
| 5,159,860 A | 11/1992 | Pietras | 81/57.19 |
| 5,161,438 A | 11/1992 | Pietras | 81/57.16 |
| 5,161,548 A | 11/1992 | Neville | 131/296 |
| 5,167,173 A | 12/1992 | Pietras | 81/57.15 |
| 5,209,302 A | 5/1993 | Robichaux et al. | 166/355 |
| 5,221,099 A | 6/1993 | Jansch | 279/151 |
| 5,251,709 A | 10/1993 | Richardson | 175/220 |
| 5,259,275 A | 11/1993 | Schulze-Beckinghausen | 81/57.16 |
| 5,282,653 A | 2/1994 | LaFleur et al. | 285/110 |
| 5,297,833 A | 3/1994 | Willis et al. | 294/102.2 |
| 5,390,568 A | 2/1995 | Pietras | 81/57.16 |
| 5,451,084 A | 9/1995 | Jansch | 294/1.1 |
| 5,452,923 A | 9/1995 | Smith | 285/145 |
| 5,520,072 A | 5/1996 | Perry | 81/57.16 |
| 5,547,314 A | 8/1996 | Ames | 405/165 |
| 5,577,566 A | 11/1996 | Albright et al. | 175/321 |
| 5,634,671 A | 6/1997 | Watkins | 285/18 |
| 5,645,131 A | 7/1997 | Trevisani | 175/171 |
| 5,706,893 A | 1/1998 | Morgan | 166/86.1 |
| 5,730,471 A | 3/1998 | Schulze-Beckinghausen et al. | 285/18 |
| 5,746,276 A | 5/1998 | Stuart | 173/1 |
| 5,787,982 A | 8/1998 | Bakke | 166/242.6 |
| 5,819,605 A | 10/1998 | Buck et al. | 81/57.33 |
| 5,836,395 A | 11/1998 | Budde | 166/321 |
| 5,839,330 A | 11/1998 | Stokka | 81/57.33 |
| 5,842,390 A | 12/1998 | Bouligny et al. | 81/57.34 |
| 5,845,549 A | 12/1998 | Bouligny | 81/57.33 |
| 5,890,549 A | 4/1999 | Sprehe | 175/71 |
| 5,957,195 A * | 9/1999 | Bailey et al. | 166/207 |
| 5,992,801 A | 11/1999 | Torres | 248/49 |
| 6,000,472 A | 12/1999 | Albright et al. | 166/380 |
| 6,065,372 A | 5/2000 | Rauch | 81/57.15 |
| 6,070,500 A | 6/2000 | Dlask et al. | 81/57.33 |
| 6,082,224 A | 7/2000 | McDaniels et al. | 81/57.15 |
| 6,082,225 A | 7/2000 | Richardson | 81/57.16 |
| 6,119,772 A | 9/2000 | Pruet | 166/81.1 |
| 6,138,529 A | 10/2000 | Pietras | 81/57.16 |
| 6,161,617 A * | 12/2000 | Gjedebo | 166/380 |
| 6,199,641 B1 | 3/2001 | Downie et al. | 173/55 |
| 6,206,096 B1 | 3/2001 | Belik | 166/77.51 |
| 6,223,629 B1 | 5/2001 | Bangert | 81/57.15 |
| 6,305,720 B1 | 10/2001 | Spiering et al. | 285/18 |
| 6,311,792 B1 | 11/2001 | Scott et al. | 175/162 |
| 6,315,051 B1 | 11/2001 | Ayling | 166/380 |
| 6,327,938 B1 | 12/2001 | Pietras | 81/57.33 |
| 6,330,911 B1 | 12/2001 | Allen et al. | 166/77.51 |
| 6,360,633 B1 | 3/2002 | Pietras | 81/57.34 |
| 6,378,630 B1 | 4/2002 | Ritorto et al. | 175/173 |
| 6,412,554 B1 | 7/2002 | Allen et al. | 166/80.1 |
| 6,419,147 B1 * | 7/2002 | Daniel | 228/135 |
| 6,425,444 B1 * | 7/2002 | Metcalfe et al. | 166/217 |
| 6,431,626 B1 * | 8/2002 | Bouligny | 166/177.4 |
| 6,480,811 B1 | 11/2002 | Denny et al. | 702/188 |
| 6,536,520 B1 | 3/2003 | Snider et al. | 166/78.1 |
| 6,581,692 B1 * | 6/2003 | Koch et al. | 166/77.51 |
| 6,668,684 B1 | 12/2003 | Allen et al. | 81/57.15 |
| 6,758,267 B1 * | 7/2004 | Sollesnes | 166/98 |
| 2001/0042625 A1 | 11/2001 | Appleton | 166/379 |
| 2002/0134555 A1 | 9/2002 | Allen et al. | 166/377 |

FOREIGN PATENT DOCUMENTS

| | | |
|---|---|---|
| EP | 0 311 455 | 4/1989 |
| EP | 0 356 204 | 11/1990 |
| EP | 0 423 055 | 4/1991 |
| EP | 0 525 247 | 2/1993 |
| GB | 1 215 967 | 12/1970 |
| GB | 2 049 518 | 12/1980 |
| GB | 2 128 526 | 5/1984 |
| GB | 2 300 896 | 11/1996 |
| GB | 2 346 576 | 8/2000 |
| GB | 2 346 577 | 8/2000 |
| WO | WO 83/03443 | 10/1983 |
| WO | WO 92/18744 | 10/1992 |
| WO | WO 93/18276 | 9/1993 |
| WO | WO 95/20471 | 8/1995 |
| WO | WO 96/18799 | 6/1996 |

| | | |
|---|---|---|
| WO | WO 98/11322 | 3/1998 |
| WO | WO 98/16716 | 4/1998 |
| WO | WO 98/32948 | 7/1998 |
| WO | WO 99/34089 | 7/1999 |
| WO | WO 99/34090 | 7/1999 |
| WO | WO 99/34091 | 7/1999 |
| WO | WO 00/22278 | 4/2000 |
| WO | WO 00/23686 | 4/2000 |
| WO | WO 00/45026 | 8/2000 |
| WO | WO 00/45027 | 8/2000 |
| WO | WO 00/79092 | 12/2000 |
| WO | WO 01/03889 | 1/2001 |
| WO | WO 01/09479 | 2/2001 |
| WO | WO 01/38688 | 5/2001 |
| WO | WO 01/66905 | 9/2001 |

OTHER PUBLICATIONS 500 or 650 HCIS Top Drive, Tesco Drilling Technology, Apr. 1998.
More Portable Top Drive Installations, Tesco Drilling Technology, 1997.
Top Drive Drilling Systems, Canrig, Feb. 1997 in Hart's Petroleum Engineer.
Product Information, (Sections 1-10) Canrig, 1996.
Valves, Wellhead Equipment Safety Systems, W-K-M Division, ACD Industries, 1980.
Portable Top Drives: What's Driving The Market? Drilling Contractor, Sep. 1994.
Autoseal Circulating Head, LaFleur Petroleum Services, Inc., 1992.
U.K. Search Report, Application No. GB 0320905-3, dated Feb. 25, 2004.

* cited by examiner

METHOD AND APPARATUS FOR REFORMING TUBULAR CONNECTIONS

BACKGROUND OF THE INVENTION

1. Field of the Invention

Embodiments of the present invention generally relate to apparatus and methods for joining tubulars used in the drilling and completion of subterranean wells. Particularly, the present invention relates to apparatus and methods for reforming a connection between tubulars.

2. Description of the Related Art

The process of drilling subterranean wells to recover oil and gas from reservoirs consists of boring a hole in the earth down to the petroleum accumulation and installing tubulars from the reservoir to the surface. Casing is the term used for tubulars installed within the wellbore as a protective liner and a means to retrieve the oil and gas from the well. Casing is typically screwed together at the surface of the well a single tubular at a time and then lowered into the wellbore. While running casing, drilling fluid must be pumped into the wellbore to pressurize the wellbore and prevent the wellbore from collapsing. Likewise, after the casing has been assembled the casing must be cemented to the wellbore to insure a pressure-tight connection to the oil and gas reservoir.

The entire pipe liner, running from the surface of the well to the bottom, is made up of multiple casing strings ("casing strings"). Each casing string is made up of multiple casing tubulars ("tubulars"). A casing string begins by using a spider on the rig floor to suspend a first tubular in the wellbore. A second tubular is placed on top of the first tubular using a top drive adapter. The two tubulars are then connected and lowered into the wellbore until the spider holds the second tubular. The process of adding tubulars repeats until the joined tubulars form a casing string of desired length. Each tubular is filled with fluid as it is run into the wellbore to maintain pressure in the wellbore and prevent collapsing. Lowering the tubulars into the wellbore is facilitated by alternately engaging and disengaging elevator slips and spider slips with the casing string in a stepwise fashion. After each string of casing is run, that string is cemented into place. Thereafter, the wellbore is drilled deeper, and another casing string is installed.

As the casing is joined and lowered into the hole, the casing may become stuck. When this occurs, load or weight must be added to the casing string to force the casing into the wellbore, or drilling fluid must be circulated down the inside diameter of the casing and out of the casing into the annulus in order to free the casing from the wellbore. To accomplish this, special rigging has traditionally been installed to axially load the casing string or to circulate drilling fluid. Drilling fluid is also added to the casing when lowering each section to prevent the casing from collapsing due to high pressures within the wellbore.

In order to circulate the drilling fluid, the top of the casing must be sealed so that the casing may be pressurized with drilling fluid. Since the casing is under pressure the integrity of the seal is critical to safe operation, and to minimize the loss of expensive drilling fluid. Once the casing reaches the bottom, circulating of the drilling fluid is again necessary to test the surface piping system, to condition the drilling fluid in the hole, and to flush out wall cake and cuttings from the hole. Fluid circulation continues until at least an amount of drilling fluid equal to the volume of the inside diameter of the casing has been displaced from the casing and wellbore. After the drilling fluid has been adequately circulated, the casing may be cemented in place.

The conventional way of joining casing is to screw together one or more strings of casing tubulars. It is well known in the art to use casings with internally and externally flush screw thread connections. Flush screw thread connections ease lowering of the tubulars into the wellbore and maximize the inner diameter of the tubulars, which maximizes production capacity of the well. A disadvantage of flush screw thread connections is that they form weak spots with a significantly lower strength than the rest of the pipe and a greater susceptibility to corrosion. Furthermore, connecting screw thread casing at the drilling floor consumes time and requires carefully machined tubulars. While safety requirements and explosion hazards at oil or gas wellheads limit the feasibility of some joining methods for tubulars, various methods of bonding and welding have been explored.

One method to connect tubulars together uses a friction welding technique where a ring is rotated at high speed while the tubing ends are pressed onto the ring. Another method involves an apparatus for bonding tubulars by positioning a body of amorphous material between adjacent end surfaces of a pair of tubulars. Thereafter, induction heating is applied to melt the amorphous material and create a metallurgical bond between the tubulars. Tubulars have also been joined by using forge/diffusion welding, induction butt-welding, or explosion.

One drawback of the bonding or welding process for joining tubulars is that the inner and outer diameters of the casing connection will become distorted. This distortion occurs due to the intense pressure or heat applied to the tubulars when joining them. Distortion of the inner diameter of the casing is problematic because it may minimize the production capacity of the well and cause tools and smaller casing to snag when lowered through the casing. Similarly, distortion of the outer diameter may cause the casing to snag when lowered through the wellbore.

Therefore, there is a need for an apparatus and method to facilitate the joining of tubulars. There is a further need for an apparatus and method for correcting the distortions created by the joining of tubulars. There is a further need for an apparatus and method for correcting distortions created by the joining of tubulars in a time efficient manner.

SUMMARY OF THE INVENTION

The present invention generally relates to a method and apparatus for connecting tubulars and reforming the connection. In one aspect of the invention, tubulars are aligned, connected, and then reformed at the connection. Either the inner diameter or the outer diameter, or both, may be reformed using a reforming member. In one embodiment, the connection is reformed by removing material from the connection. In another embodiment, the connection is reformed by reshaping the connection.

In another aspect, the present invention provides an apparatus for joining tubulars. The apparatus includes a tubular gripping member and a conveying member operatively connected to the tubular gripping member and at least partially insertable into an interior of tubulars. A reforming member may be operatively connected to the conveying member for reforming the connection between the tubulars. In one embodiment, the conveying member includes a telescoping tubular for extending or retracting the reforming member.

In another aspect still, the present invention provides an apparatus for joining tubulars. The apparatus includes a tubular gripping member and a reforming member for reforming an outer portion of the tubulars.

In yet another aspect, the present invention provides a method of installing a tubular string in a wellbore. The method includes placing a first tubular having an upper end in the wellbore. The upper end is joined to a lower end of a second tubular, thereby forming a tubular junction. The tubular junction is then reformed to remove any distortions.

In yet another aspect, the present invention provides a system for installing tubulars into a well. The system includes a top drive unit, a top drive adapter, a reforming member operatively connected to the top drive adapter, and a gripping member operatively coupled to the top drive unit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
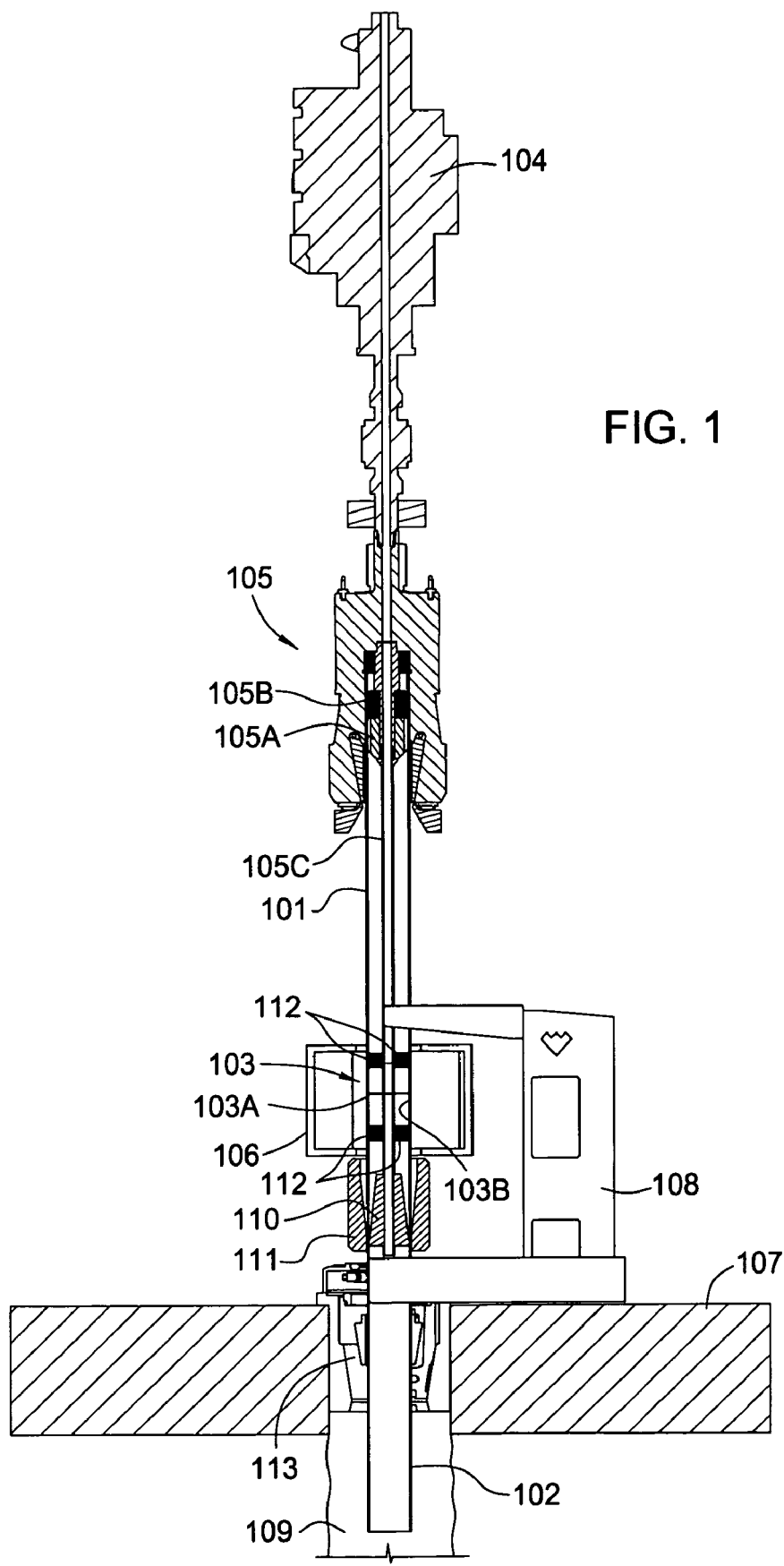
FIG. 1 is a cross-sectional view of a rig assembly for joining casing according to aspects of the present invention

FIG. 1 shows a cross-sectional view of equipments used to connect one or more tubulars. As shown, a lower tubular 102 is suspended in the wellbore 109 using a spider 113 disposed in the rig floor 107. The spider 113 grips the lower tubular 102 and prevents the lower tubular 102 from falling into the wellbore 109 during the connection process. It must be noted that, as used herein, the lower tubular 102 may include a single tubular or a partial casing string formed by one or more tubulars.

FIG. 1 also shows a top drive unit 104 suspended from a rig above and used to exert axial and rotational forces on the rest of the rig assembly, which may be a casing or drilling assembly. A top drive adapter 105 threadedly connects to a lower portion of the top drive unit 104. The top drive adapter 105 transfers forces exerted by the top drive unit 104 onto an upper tubular 101. The top drive adapter 105 grips a side portion of the upper tubular 101 and is an example of a tubular gripping member. However, other types of tubular gripping members are equally applicable in accordance with the aspects of the present invention. The top drive adapter 105 may include a fill-up tool 105B for dispensing and circulating fluid or cement. The top drive adapter 105 may also include an autoseal tool 105A. The autoseal tool 105A may be used to create a pressurized seal on the top of the upper tubular 101. The pressurized seal may be necessary to keep fluid in the hole and prevent casing from collapsing.

An extension member 105C, also known as an inner tubular, extends from the bottom of the fill-up tool 105B along the inside of the tubulars 101, 102. In FIG. 1, the inner tubular 105C extends past the tubular connection 103 into the lower tubular 102. This allows fluid to be pumped into the wellbore 109 without interfering with the tubular connection 103. Packers 112 attach to the inner tubular 105C and are movable therewith. The packers 112 are disposed above and below the tubular connection 103 to isolate an area around the tubular connection 103. The isolated area is filled with gas when the upper tubular 101 and the lower tubular 102 are bonded. Filling the area with an inert gas or a catalyzing agent may prevent corrosion or accelerate the bonding process. An inner diameter broach 110 is attached to a lower portion of the inner tubular 105C. The inner diameter broach 110 may be used to reform the tubular connection 103 after the upper tubular 101 and lower tubular 102 are joined.

FIG. 1 also shows a power frame 108 stationed above the rig floor 107. The power frame 108 may carry devices such as the bonding apparatus 106 to and from the wellbore 109. In addition to the bonding apparatus 106, which is used to join the upper tubular 101 and the lower tubular 102, the power frame 108 may also include an outer-diameter broach 111. The outer-diameter broach 111 may be used to reform the outer portions of the tubular connection 103 after the upper tubular 101 and lower tubular 102 are joined.

As shown in FIG. 1, the upper tubular 101 is aligned with the lower tubular 102 and the tubulars 101, 102 are ready to be joined. The bonding apparatus 106 bonds or welds the upper tubular 101 and the lower tubular 102 together. Alternatively, the top drive unit 104 may exert force alone or in conjunction with the bonding apparatus 106 to connect the upper tubular 101 to the lower tubular 102. The bonding process for joining the upper tubular 101 and the lower tubular 102 distorts the outer diameter 103A and the inner diameter 103B of the tubular connection. After the upper tubular 101 and the lower tubular 102 are joined (also referred to as the "tubular string 121"), the bonding apparatus 106 and the power frame 108 are removed, but the outer-diameter broach 111 is left in place. Thereafter, the spider 113 is released and the top drive unit 104 supports the tubular string 121 in the wellbore 109.

Figures 2, 2A:
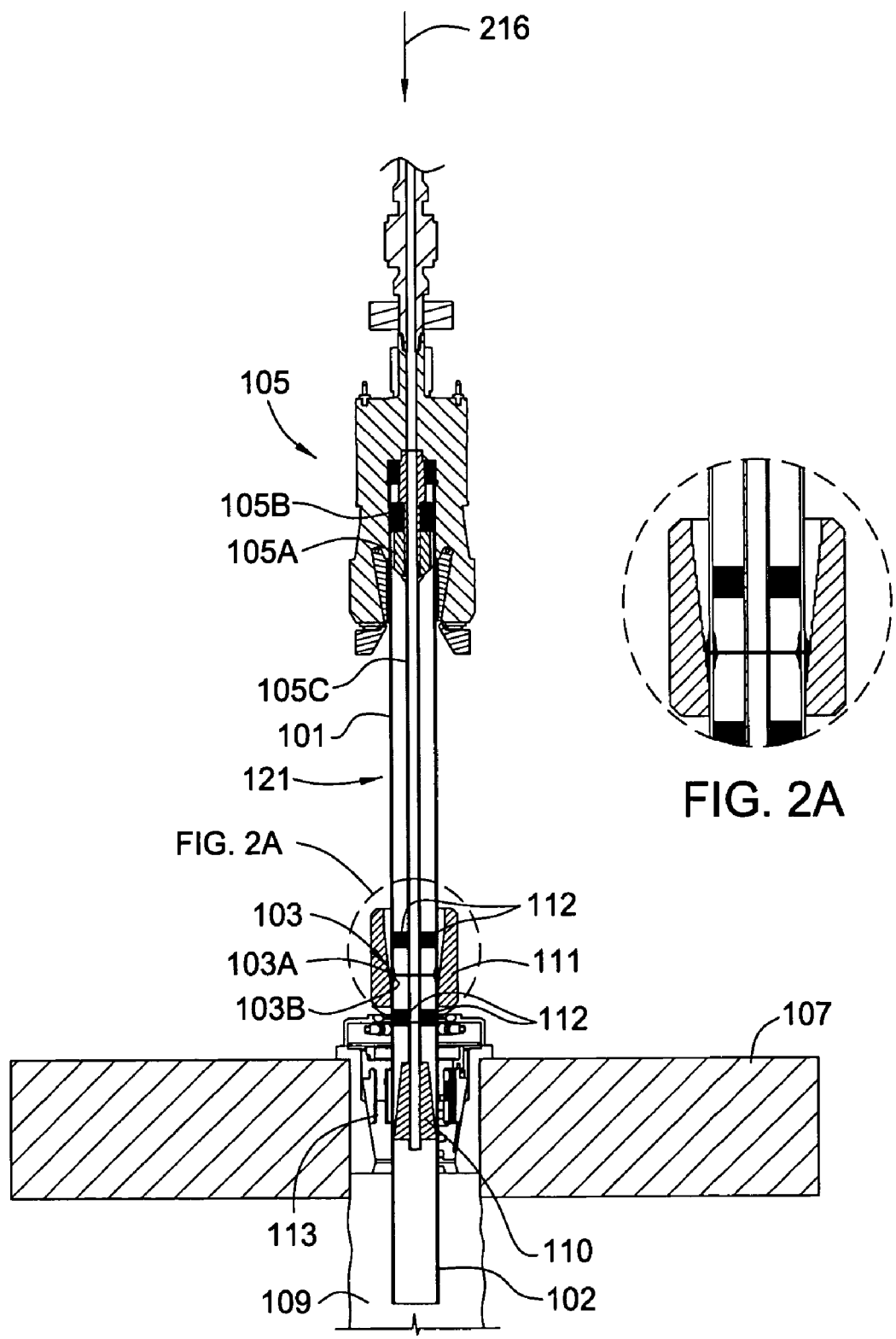
FIG. 2 is a cross-sectional view of the rig assembly while reforming an outer diameter of the casing.
FIG. 2A is an exploded view of the outer diameter broach.

FIG. 2 is a cross-sectional view of the rig assembly lowering the tubular connection 103 past the outer diameter broach 111. The top drive adapter 105 grips the upper tubular 101 to ensure that the tubular string 121 does not fall into the wellbore 109 as they are lowered. The arrow 216 of FIG. 2 indicates the lowering of the top drive unit 104 and the top drive adapter 105, which in turn lowers the tubular string 121. As discussed below, the outer-diameter broach 111 is initially below the tubular connection 103 and designed to reform any external deformities created in the tubular connection 103 by the bonding process. As the tubular string 121 is lowered, the outer diameter broach 111 passes over the tubular connection 103 and reforms the deformities in the outer diameter 103A. When the tubular string 121 reaches the desired position, the spider 113 grabs the upper tubular 101, which allows the top drive adapter 105 to release its grip on the upper tubular 101.

Figures 3, 3A:
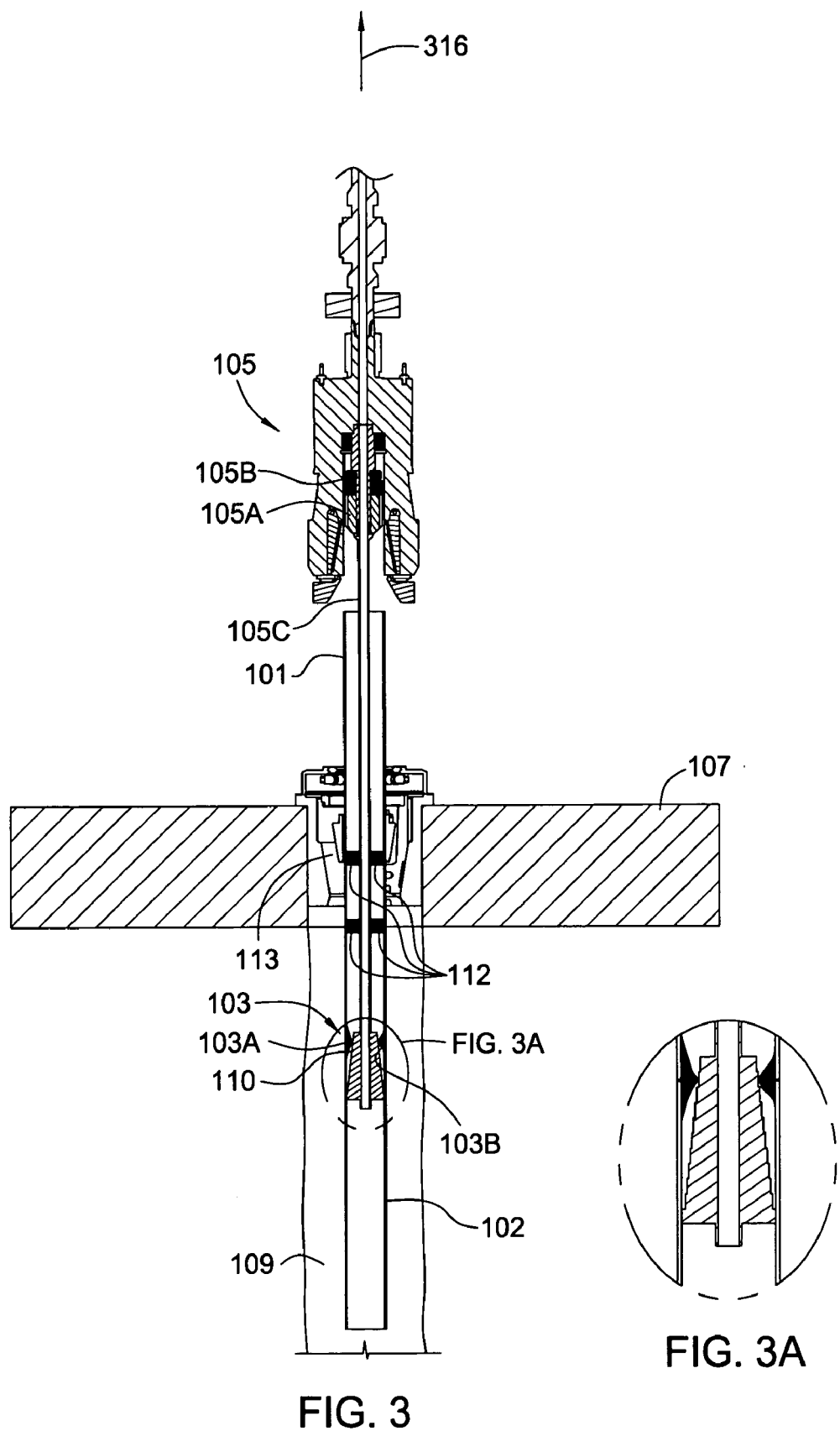
FIG. 3 is a cross-sectional view of the rig assembly while reforming an inner diameter of the casing.
FIG. 3A is an exploded view of the inner diameter broach.
Figure 6:
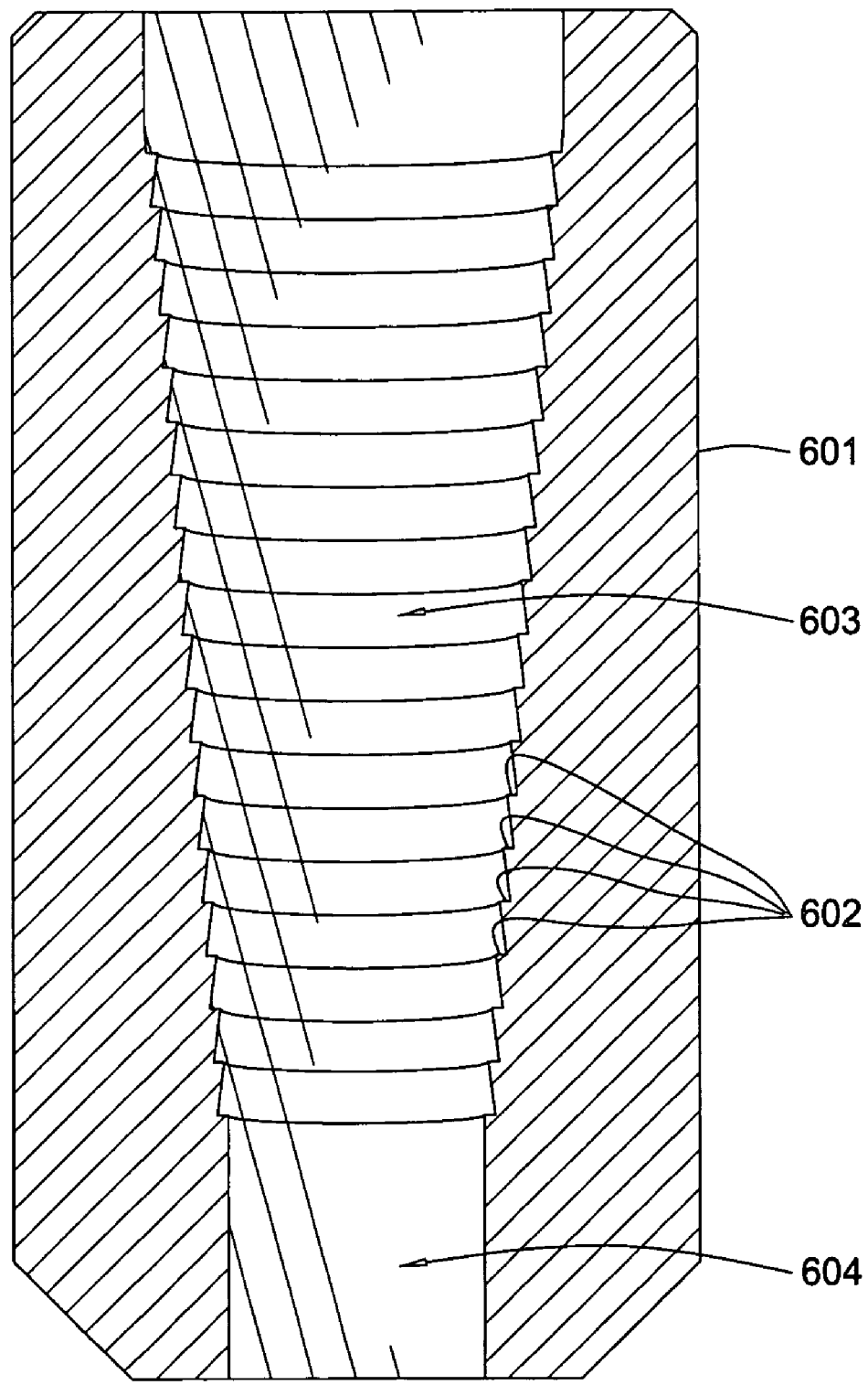
FIG. 6 is a cross-sectional view of a round broach for reforming an outer diameter of a tubular.

FIG. 6 is a cross sectional view of a round outer diameter broach 601 for reforming an outer diameter 103A of the tubular string 121. FIG. 1, shows the outer diameter broach 601 in the larger tubular system. In one embodiment, an outer diameter broach 601 is an inverted and flipped version of the inner diameter broach 110. The outer diameter broach 601 is designed such that portions of the tubular string 121 pass through the inner channel 603 of the outer diameter broach The inner channel 603 has successive circular cutting edges 602 that narrow, with each successive edge from top to bottom. As the tubular connection 103 moves along through the outer diameter broach 601, as depicted in FIGS. 1 through 3, each successive step cuts a small piece of the deformed tubular connection 103 until the connection 103 has been reformed to about the size of the lowest and smallest cutting edge. An aligning section 604 keeps the outer diameter broach 601 properly aligned with the tubular string 121.

FIG. 3 is a cross-sectional view of the rig assembly with the top drive unit 104 ready for removal. The arrow 316 of FIG. 3 indicates the raising of the top drive unit 104 and the top drive adapter 105, which in turn raises the inner diameter broach 110. The tubular string 121 remains stationary while the inner diameter broach 110 moves axially past the tubular connection 103 and reforms the tubular connection inner diameter 103B.

Figures 4, 4A:
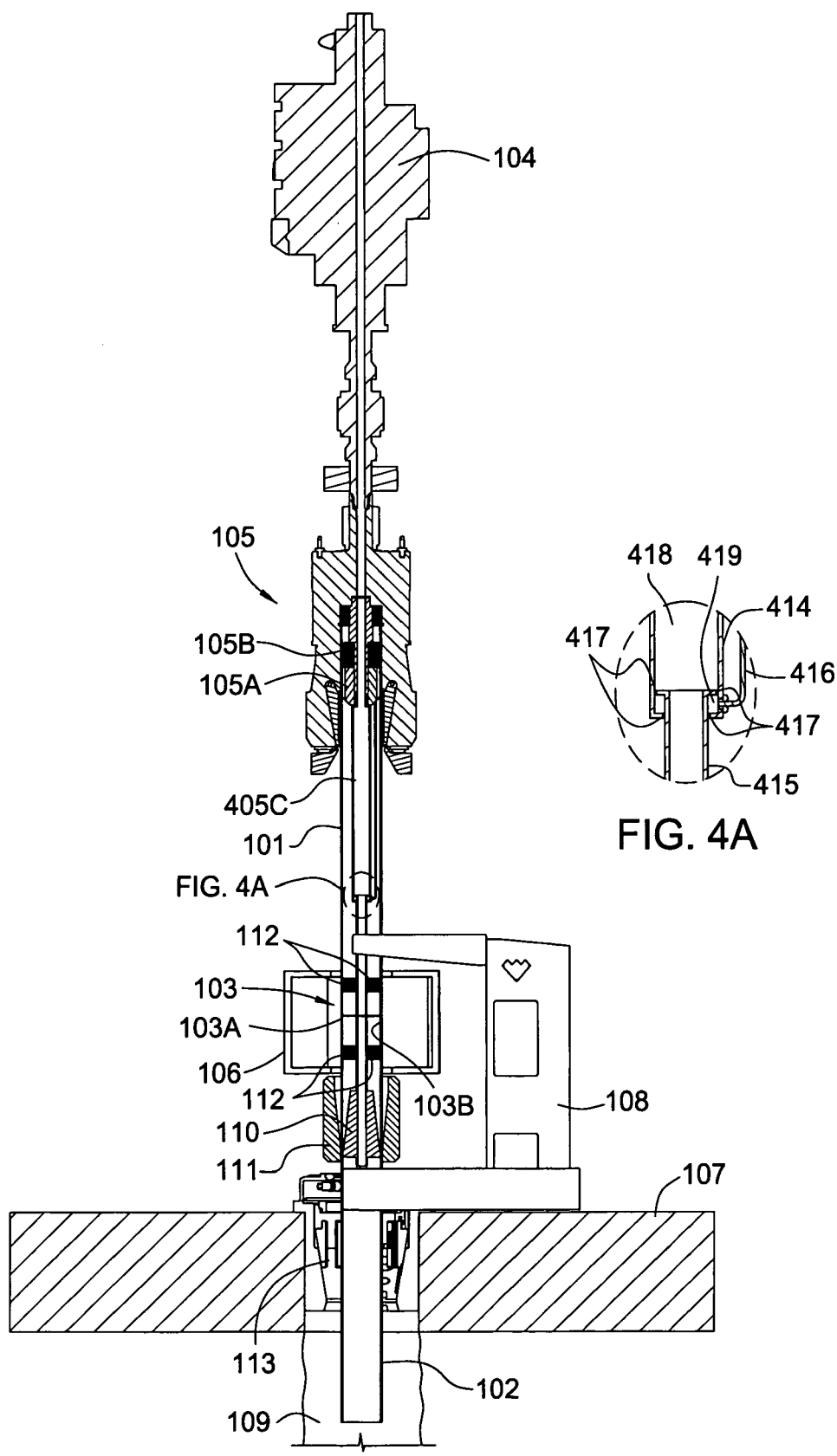
FIG. 4 is a cross-sectional view of a rig assembly with a material-reforming member according to another aspect of the present invention.
FIG. 4A is an exploded partial view of the telescoping tubular.
Figure 5:
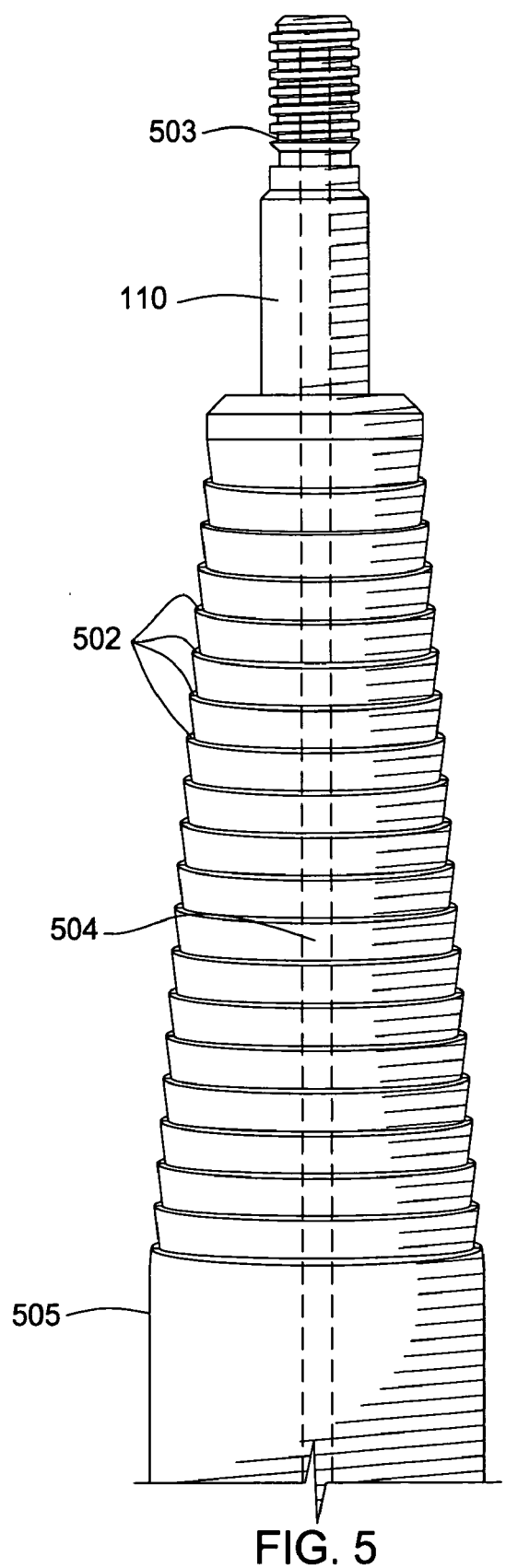
FIG. 5 is a cross-sectional view of a round broach for reforming an inner diameter of a tubular.

FIG. 5 is an exploded view of a round inner diameter broach 110 for reforming an inner diameter 103B of a tubular 101. FIGS. 1 through 4 show the position of the inner diameter broach 110 within the rig assembly. The inner diameter broach 110, as discussed below, is but one example of a material reforming member. The inner diameter broach 110 is shaped like a cone with step-like cutting edges 502. The diameter of the cutting edges 502 increases from top to bottom. As the inner diameter broach 110 is pulled through the tubular string 121, each of the cutting edges 502 produces a larger diameter hole in the tubular string 121.

Preferably the outer diameter of the last cutting edge is equal to the inner diameter of the tubular string 121. However, because tubular string 121 is not perfectly round, the broach 110 must be designed to accommodate irregularities in the inner diameter. One way of dealing with the irregularities is setting the outer diameter of the last cutting edge to a known diameter that is smaller than the ideal inner diameter of the tubular string 121. The smaller known diameter, called a "drift diameter," is assured by using a "drift bar." The drift diameter is specifically defined by America Petroleum Institute specification #API5CT for casing and #API5D for drilling pipe. For example, before a tubular 101 is installed in the wellbore 109, a metal cylinder or "a drift bar," is forced through the tubular 101 to ensure the tubular 101 has a minimum inner diameter. If the drift bar does not fit through the tubular 101, the tubular 101 is considered irregular and will not be used. For example, a tubular with a 9⅝ inch outer diameter might have an ideal inner diameter of 8.5 inches and a drift inner diameter of 8.4125 inches. To ensure a drift inner diameter of 8.4125 inches, a drift bar with an outer diameter of 8.4125 inches is forced through the tubular 101.

A lower portion of the broach 110 includes a control section 505 that keeps the broach 110 centered about the tubular string 121 while reforming the connection 103. Preferably, the outer diameter of the control section 505 is about the same size as the drift inner diameter of the tubular 101. The broach 110 also contains a threaded shaft 503 for attaching to the rig assembly. The broach 110 may also contain a channel 504 for passing liquid or other objects through the broach 110. While the broach 110 is shown to have a single vertical channel 504, multiple channels may also be employed. Additionally, the broach 110 may include horizontal channels (not shown) that allow fluid from the vertical channel 504 to flow to the cutting edges 502 to remove material already cut and cool the tubular 101 as it is cut. Furthermore, the broach 110 allows the inner diameters of the tubulars 101, 102 to be reformed with one linear motion. This saves time because the linear motion used to reform the inner diameter is already required by the traditional method for joining tubulars 101, 102.

Figure 7:
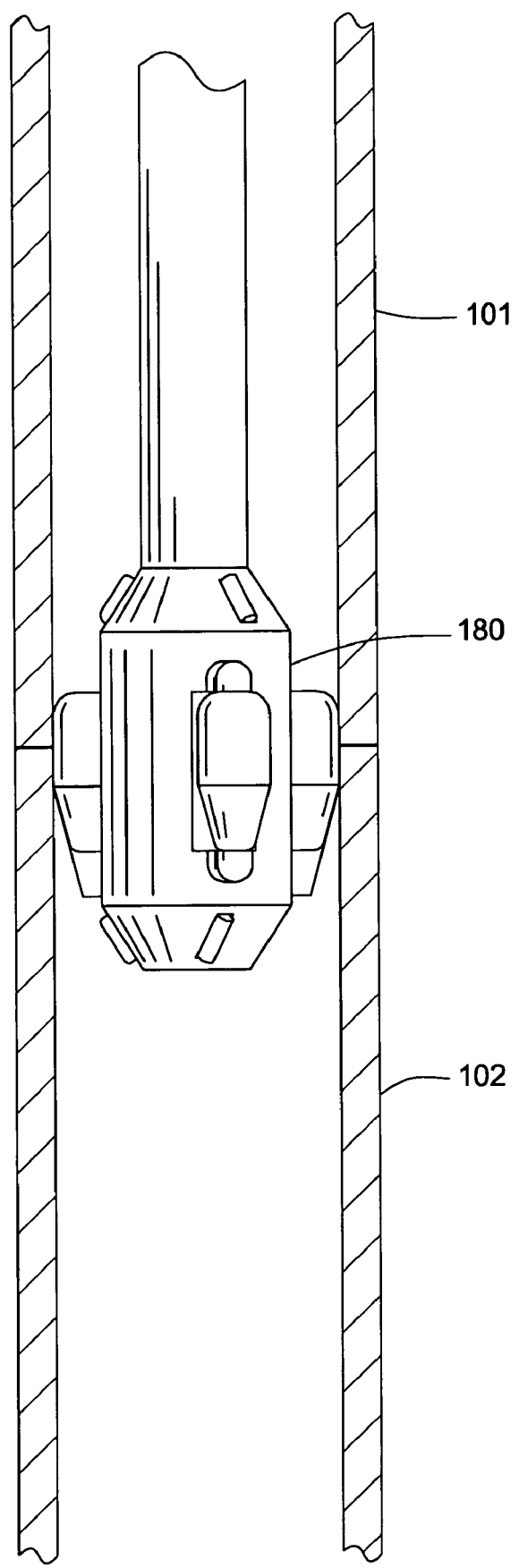
FIG. 7 shows an exemplary roller expander.

In addition to a broach 110, other types of material reforming members are applicable according to aspects of the present invention. For example, a drill like member may be use to remove material from the connection. A honing member may also be inserted and rotated to remove the distortion. A ridge reamer may also be used to remove the distortion. Furthermore, other methods of reshaping the distortion without removing material exist. For example, a cylindrical member, also known as a roller expander 180, which expands when rotated may reshape the distortion by flattening the distortion against the walls of the tubulars. FIG. 7 shows an exemplary roller expander disposed adjacent to a tubular connection. Also a smooth cone shaped member may be pulled through the tubular to reshape the tubular connection.

FIG. 4 is another embodiment of the present invention, incorporating a material-reforming member attached to a telescoping tubular 405C. The sequence for joining tubulars 101, 102 would be analogous to those depicted in FIGS. 1 through 3. The telescoping tubular 405C is capable of extending and retracting independently of other operations. The enlarged view in FIG. 4 shows an example of a telescoping tubular 405C with an inner channel 418 for passing fluid. The telescoping tubular 405C includes a piston 415 and cylinder 414 assembly operatively connected. The cylinder 414 may be fixed to the top drive adapter 105. The piston 415 is free to slide within the cylinder 414. A hydraulic line 416 is used to pump hydraulic fluid into a chamber 419 between the cylinder 414 and the piston 415. Seals 417 prevent the hydraulic fluid from leaking into the inner channel 418. As hydraulic fluid is pumped into the chamber 419, the piston 415 is forced up and the telescoping tubular 405C retracts. Conversely, pumping hydraulic fluid out of the chamber 419 will extend the tubular 405C.

One advantage of the telescoping tubular 405C is increased temporal efficiency. Normally when the top drive adapter 105 is inserted into the upper tubular 101, the top drive unit 104 is raised until the entire inner tubular 405C is higher than the upper tubular 101. However, when the telescoping tubular 405C is retracted, the top drive unit 104 does not need to be raised as high for insertion and removal of the top drive adapter 105 because the inner tubular 405C may be retracted during insertion. Further, because the telescoping tubular may be retracted at anytime, the inner diameter broach 110 may reform the tubular connection inner diameter 103B anytime after the tubular connection 103 has been made. For example, the inner diameter broach 110 may reform the tubular connection inner diameter 103B before inserting the tubulars into wellbore 109 or while inserting the tubulars into the wellbore 109.

Preferably, the broach 110 reforms the tubular connection 103 inner diameter 103B while lowering the tubular string 101, 102 into the wellbore 109. The telescoping tubular 405C allows the top drive adapter 105 to retract the telescoping inner tubular 405C with increased force because it is pulling against itself as opposed to pulling against the weight of the tubular string 101, 102 and the grip of the spider 113.

While the foregoing is directed to embodiments of the present invention, other and further embodiments of the invention may be devised without departing from the basic scope thereof, and the scope thereof is determined by the claims that follow.

We claim:

1. A method of joining tubulars at the surface of a well, comprising:
   providing a tubular gripping member, a conveying member operatively connected to the tubular gripping member, and a reforming member;
   gripping a first tubular with the tubular gripping member;
   aligning the first tubular with a second tubular;
   forming a connection between the first tubular and the second tubular; and
   reforming an inner diameter of the connection after the connection is formed.

2. The method of claim 1, wherein reforming the inner diameter comprises removing a material from the connection.

3. The method of claim 1, wherein reforming the inner diameter comprises reshaping the inner diameter of the connection.

4. The method of claim 1, wherein reforming the inner diameter comprises:
   placing the reforming member proximate to the connection; and
   actuating the reforming member.

5. The method of claim 4, wherein reforming the inner diameter further comprises moving the reforming member axially in relation to the first and second tubulars.

6. The method of claim 4, wherein reforming the inner diameter further comprises rotating the reforming member relative to the first and second tubulars.

7. The method of claim 6, wherein reforming the inner diameter further comprises moving the reforming member axially in relation to the first and second tubulars.

8. The method of claim 1, further comprising lowering the connected tubulars into the well.

9. The method of claim 8, wherein the inner diameter of the connection is reformed while lowering the connected tubulars into the well.

10. The method of claim 8, wherein the inner diameter of the connection is reformed before lowering the connected tubulars into the well.

11. The method of claim 1, further comprising:
    reforming an outer diameter of the connection.

12. The method of claim 1, further comprising circulating a fluid through the first and second tubulars.

13. The method of claim 1, further comprising applying a pressurized seal on an upper portion of the first tubular.

14. The method of claim 1, wherein forming the tubular junction comprises bonding the first and second tubulars.

15. The method of claim 1, further comprising determining a minimum inner diameter in the first tubular.

16. An apparatus for joining tubulars, comprising:
    a top drive adapter configured to grip an outer surface of one of the tubulars;
    a conveying member operatively connected to the tubular gripping member and at least partially insertable into an interior of the tubulars; and
    a reforming member operatively connected to the conveying member, wherein the reforming member is configured to be inserted into the tubulars.

17. The apparatus of claim 16, wherein the reforming member comprises a material shaping member.

18. The apparatus of claim 17, wherein the material shaping member comprises a cone.

19. The apparatus of claim 17, wherein the material shaping member comprises a roller expander.

20. The apparatus of claim 16, wherein the reforming member comprises a material removal member.

21. The apparatus of claim 20, wherein the material removal member comprises a tool selected from the group consisting of a broach, a hone, a drill bit, and a ridge reamer.

22. The apparatus of claim 16, further comprising an outer reforming member for reforming an outer diameter of the tubulars.

23. The apparatus of claim 16, wherein the reforming member is rotatable.

24. The apparatus of claim 16, wherein the conveying member is extendable.

25. The apparatus of claim 16, wherein the conveying member comprises a piston and cylinder assembly.

26. The apparatus of claim 16, wherein the conveying member comprises one or more fluid channels.

27. The apparatus of claim 26, wherein the one or more fluid channels comprise one or more axial channels.

28. The apparatus of claim 26, wherein the one or more fluid channels comprise one or more radial channels.

29. A system for installing tubulars into a well comprising:
    a top drive unit;
    a reforming member operatively connected to the top drive unit, wherein the reforming member is configured to be inserted into the tubulars for reforming an inner portion of a tubular junction; and
    a gripping member operatively coupled to the top drive unit.

30. The system of claim 29, further comprising:
    a power frame for moving one or more tools for connecting tubulars.

31. The system of claim 30, further comprising a bonding apparatus disposed on the power frame.

32. The system of claim 31, further comprising a second gripping member disposed in a rig floor.

33. The system of claim 32, further comprising a second reforming member disposed around the tubulars.

34. A method of joining tubulars at the surface of a well, comprising:
    aligning an end of a first tubular with an end of a second tubular;
    forming a connection between the ends of the first tubular and the second tubular; and
    reforming an inner diameter of the connection between the first and second tubulars, wherein reforming the inner diameter comprises rotating a reforming member relative to the first and second tubulars.

35. A method of joining tubulars at the surface of a well, comprising:
    aligning a first tubular with a second tubular;
    forming a connection between the first tubular and the second tubular;
    reforming an inner diameter of the connection between the first and second tubulars; and
    lowering the connected tubulars into the well, wherein the inner diameter of the connection is reformed while lowering the connected tubulars into the well.

36. A method of joining tubulars at the surface of a well, comprising:

aligning a first tubular with a second tubular;

forming a connection between the first tubular and the second tubular;

positioning a reforming member adjacent the connection after the connection is formed;

reforming an inner diameter of the connection between the first and second tubulars; and lowering the connected tubulars into the well after the inner diameter of the connection is reformed.

37. A method of joining tubulars at the surface of a well, comprising:

aligning a first tubular with a second tubular;

forming a connection between the first tubular and the second tubular;

reforming an inner diameter of the connection; and reforming an outer diameter of the connection.

38. A method of joining tubulars at the surface of a well, comprising:

suspending at least a portion of a first tubular in the well;

aligning the first tubular with a second tubular;

forming a connection between the first tubular and the second tubular; and reforming an outer diameter of the connection between the first and second tubulars, wherein reforming the outer diameter comprises placing a reforming member proximate to the connection, actuating the reforming member and moving the reforming member axially in relation to the first and second tubulars.

39. The method of claim 38, wherein reforming the outer diameter comprises removing a material from the connection.

40. The method of claim 38, wherein reforming the outer diameter comprises reshaping the outer diameter of the connection.

41. The method of claim 38, wherein reforming the outer diameter comprises rotating the reforming member relative to the first and second tubulars.

42. The method of claim 38, further comprising reforming the inner diameter of the connection between the first and second tubulars.

43. A method of installing a tubular string in a wellbore, comprising:

placing a first tubular in the wellbore, the first tubular having an upper end;

joining a lower end of a second tubular to the upper end to form a tubular junction;

reforming at least an outer portion of the tubular junction; and applying a pressurized seal on an upper portion of the second tubular.

44. The method of claim 43, further comprising circulating a fluid through the first and second tubulars.

45. The method of claim 43, further wherein forming the tubular junction comprises bonding the first and second tubulars.

46. The method of claim 43, wherein an inner portion of the tubular junction is reformed.

\* \* \* \* \*

UNITED STATES PATENT AND TRADEMARK OFFICE
CERTIFICATE OF CORRECTION

PATENT NO. : 7,100,697 B2 Page 1 of 1
APPLICATION NO. : 10/236026
DATED : September 5, 2006
INVENTOR(S) : David M. Haugen and Doyle F. Boutwell, Jr.

It is certified that error appears in the above-identified patent and that said Letters Patent is hereby corrected as shown below:

Column 7, Claim 16, Line 65: Please delete "tubular gripping member" and insert --top drive adapter--.

Signed and Sealed this

Third Day of April, 2007

JON W. DUDAS
*Director of the United States Patent and Trademark Office*